(12) United States Patent
Lu (10) Patent No.: US 8,036,504 B2
(45) Date of Patent: Oct. 11, 2011

(54) LOOP BACK DEVICE AND METHOD OF FABRICATION

(75) Inventor: Yu Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 27 days.

(21) Appl. No.: 12/358,359

(22) Filed: Jan. 23, 2009

(65) Prior Publication Data

US 2009/0214163 A1   Aug. 27, 2009

Related U.S. Application Data

(60) Provisional application No. 61/023,608, filed on Jan. 25, 2008.

(51) Int. Cl.
| | |
|---|---|
| G02B 6/00 | (2006.01) |
| G02B 6/26 | (2006.01) |
| G02B 6/38 | (2006.01) |
| G02B 6/42 | (2006.01) |
| B29C 51/16 | (2006.01) |
| B29C 65/00 | (2006.01) |
| B29C 65/02 | (2006.01) |
| B32B 37/00 | (2006.01) |
| B32B 38/00 | (2006.01) |

(52) U.S. Cl. .............. 385/32; 385/71; 385/135; 156/64; 156/212

(58) Field of Classification Search .................... 385/32, 385/71, 135; 156/64, 212
See application file for complete search history.

(56) References Cited

U.S. PATENT DOCUMENTS

| | | | |
|---|---|---|---|
| 5,457,763 A * | 10/1995 | Kerry et al. .................... | 385/135 |
| 6,579,014 B2 | 6/2003 | Melton et al. | |
| 6,648,520 B2 | 11/2003 | McDonald et al. | |
| 7,264,402 B2 | 9/2007 | Theuerkorn et al. | |
| 7,349,605 B2 | 3/2008 | Noonan et al. | |
| 7,489,849 B2 | 2/2009 | Reagan et al. | |
| 7,630,610 B2 | 12/2009 | Cobb, III et al. | |
| 7,680,388 B2 | 3/2010 | Reagan et al. | |

* cited by examiner

Primary Examiner — Ryan Lepisto
Assistant Examiner — Jerry Blevins
(74) Attorney, Agent, or Firm — Merchant & Gould P.C.

(57) ABSTRACT

Methods tune all fiber loops in a loop back device to an established insertion loss value to produce a consistent overall loss of the loop back device. One method involves establishing a desired loss for fiber loops, securing the fiber loops to a MT ferrule, measuring an actual loss associated with each of the fiber loops, and comparing the actual loss with the desired loss. The method further involves changing a radius of a bend in any fiber loop where the actual loss is greater than or less than the desired loss until the actual loss associated with that fiber loop is substantially equal to the desired loss. Once the actual loss measured for the fiber loop is substantially equal to the established desired loss, the method secures the fiber loop to prevent a change in any radius of the bends.

18 Claims, 5 Drawing Sheets

LOOP BACK DEVICE AND METHOD OF FABRICATION

CROSS REFERENCE TO RELATED APPLICATION

This application claims the benefit of U.S. Provisional Patent Application Ser. No. 61/023,608, filed Jan. 25, 2008, which application is hereby incorporated by reference in its entirety.

TECHNICAL FIELD

The disclosure relates to fiber optic cable networks. More specifically, the disclosure relates to loop back devices and methods for fabricating.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables, stub cables, drop cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

U.S. Patent Publication No. 2006/0233506A1, now U.S. Pat. No. 7,349,605, which is hereby incorporated herein by reference in its entirety, discloses a fiber optic network including a distribution cable having factory terminated breakout locations. Each breakout location includes a factory installed multi-fiber connector adapted for connection to a connectorized branch cable (e.g., a stub cable, drop cable or other cable that branches from a main trunk of the distribution cable) in the field. At the factory, loop-back connectors are connected to the multi-fiber connectors to facilitate testing the breakout locations when the distribution cable is installed in the field. For example, upon installation of the distribution cable, a test signal can be injected into the trunk of the distribution cable from a first location (e.g., the central office), transmitted from the trunk through the breakout location, looped back at the loop back connector, transmitted back through the trunk and received at the first location. In this way, the testing process is made more efficient by allowing testing from one location.

SUMMARY

Features of the present disclosure relate to methods for making a fiber optic loopback device (e.g., a fiber optic male loopback connector such as a loopback plug, a fiber optic female loopback connector or any other type of device). One aspect of the present disclosure involves tuning a fiber loop in a loop back device to provide the fiber loop with a desired insertion loss value. One method for tuning fiber loops involves selectively changing the bend radiuses of the fiber loops to either increase or decrease the insertion loss of each loop.

Features of the present disclosure also relate to a loop back device for testing lines in a fiber optic network. The loop back device includes a ferrule defining fiber openings and multiple fibers defining fiber loops. The fibers have ends mounted in the fiber openings of the ferrule where at least some of the fiber loops have different bend radiuses than other fiber loops of the loopback plug. The bend radiuses are selected to tune the loop back device so that each of the fiber loops has approximately the same insertion loss value.

These and other features and advantages will be apparent from a reading of the following detailed description and a review of the associated drawings. It is to be understood that both the foregoing general description and the following detailed description are explanatory only and are not restrictive of the broad aspects of the disclosure.

DETAILED DESCRIPTION

Figure 1:
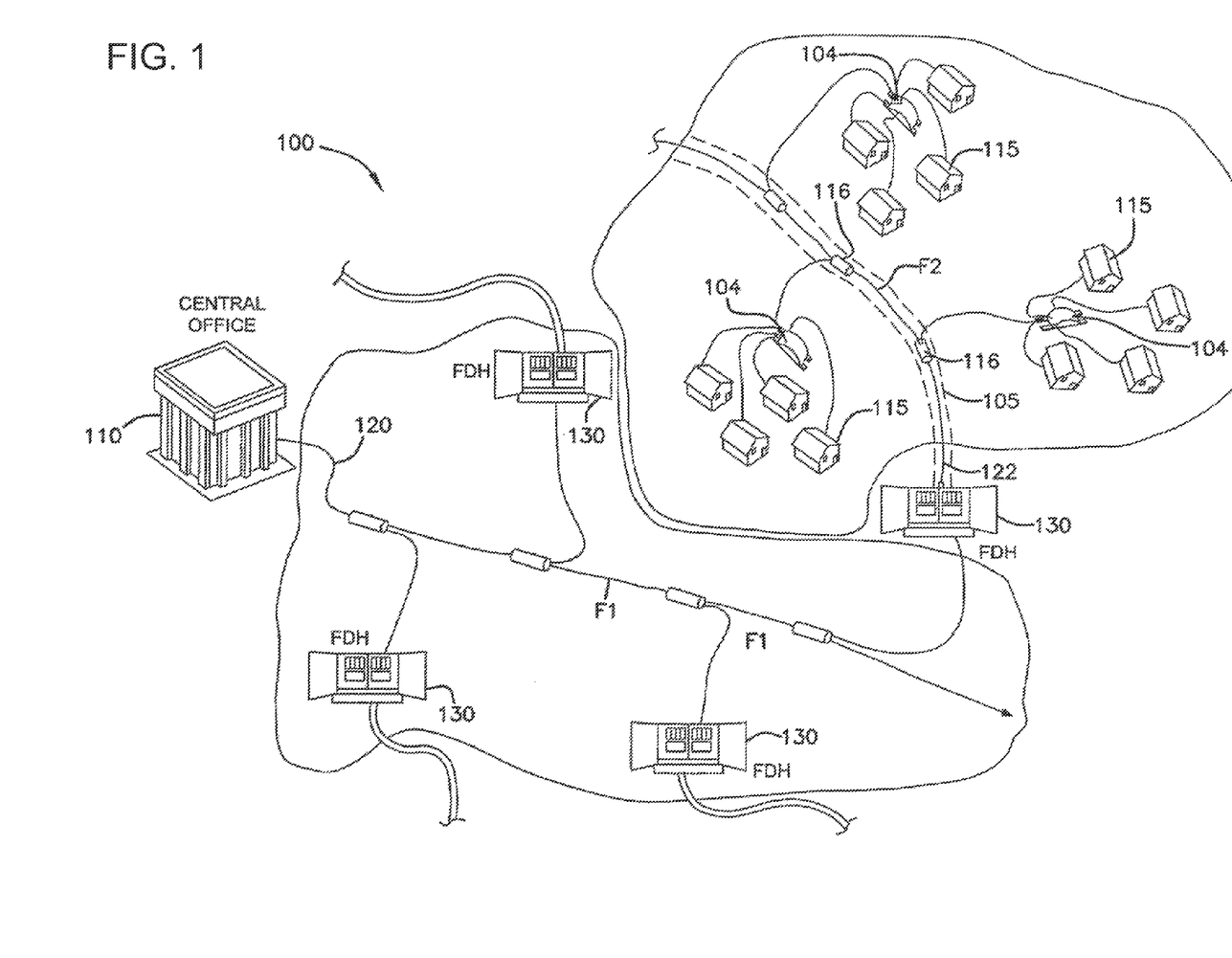
FIG. 1 illustrates a conventional network that may use factory integrated terminations.

FIG. 1 illustrates an exemplary passive optical network 100. As shown in FIG. 1, the network 100 may include a central office 110 connected to a number of end subscribers 115 (also called end users 115 herein). The central office 110 may additionally connect to a larger network such as the Internet (not shown) and a public switched telephone network (PSTN). The various lines of the network can be aerial or housed within underground conduits (e.g., see conduit 105).

In general, the network 100 includes feeder distribution cables 120 associated at one end with the central office 110. The distribution cables often include a main cable or trunk, and a plurality of branch cables that branch from the main cable. The portion of network 100 that is closest to central office 110 is generally referred to as the F1 region. The F1 portion of the network may include a feeder cable (i.e., an F1 distribution cable) having on the order of 12 to 48 fibers; however, alternative implementations may include fewer or more fibers. The network 100 also has an F2 portion that includes cables and components located in closer proximity to the subscriber/end users 115.

The network 100 also may include fiber distribution hubs (FDHs) 130 that receive branch fibers of the distribution cable 120 and that output one or more F2 distribution cables 122. In general, an FDH 130 is an equipment enclosure that may include a plurality of optical splitters (e.g., 1-to-8 splitters, 1-to-16 splitters, or 1-to-32 splitters) for splitting the incoming feeder fibers into a number (e.g., 216, 432, etc.) of output distribution fibers corresponding to the F2 distribution cables 122. The F2 distribution cables are routed from the FDH 130 to locations in close proximity to the end users 115.

The network 100 typically includes a plurality of breakout locations 116 at which branch cables (e.g., drop cables, stub cables, etc.) are separated out from and optically coupled to trunks of the distribution cables 122. Breakout locations 116 also can be referred to as tap locations or branch locations and branch cables also can be referred to as breakout cables or tethers. At a breakout location, fibers of the trunk of the distribution cable can be broken out and connectorized to form a connectorized tether. In other embodiments, fibers of the trunk can be broken out and spliced to a length of optical fiber having a connectorized free end so as to form a connectorized tether.

Stub cables are typically branch cables that are routed from breakout locations 116 to intermediate access locations 104, such as a pedestals, drop terminals or hubs. Intermediate access locations 104 can provide connector interfaces located between breakout locations 116 and the subscriber locations 115. A drop cable is a cable that typically forms the last leg to a subscriber location 115. For example, drop cables can be routed from intermediate access locations 104 to subscriber locations 115. Drop cables also can be routed directly from breakout locations 116 to subscriber locations 115, thereby bypassing any intermediate access locations 104.

In certain embodiments, factory integrated terminations may be used at the F1 and/or the F2 region to provide environmentally sound and cost effective splicing protection. Factory integrated terminations refer to the use of factory integrated access (tap) points at specified locations, such as at breakout locations 116, in the network 100 instead of field installed splices. These access points 116 may be connectorized to provide a simple plug and play approach in the distribution portion of the network 100 when connecting subscribers 115 to the network 100. For example, implementations consistent with the principles of the disclosure may use rugged outside plant connectors that can accommodate single or multi-port connectors.

In certain embodiments, a loop back device can be utilized to test factory integrated terminations of a distribution cable. Such a loop back device can be used to facilitate testing the transmission capabilities of the trunk fibers and/or the branch fibers. A test signal can be transmitted into a distribution cable at the central office 110. The signal travels through the trunk of the distribution cable, passes through a break-out location, loops back at the loop back device, travels back through breakout and trunk and is detected at the central office. Properties of the return signal provide an indication of the functionality of the optical fibers of the distribution cable being tested. Use of a loop back device may eliminate shuttling back and forth between a tether connector (or breakout location 116) and a central office 110 when testing is performed. Eliminating shuttling can produce significant time and cost savings when testing deployed distribution cables. An exemplary method of testing a fiber drop terminal from a single location using loop back connectors is shown in U.S. patent application Ser. Nos. 11/198,848, now U.S. Pat. No. 7,489,849, and 11/198,153, now U.S. Pat. No. 7,680,388, the disclosures of which are hereby incorporated by reference.

Figure 2:
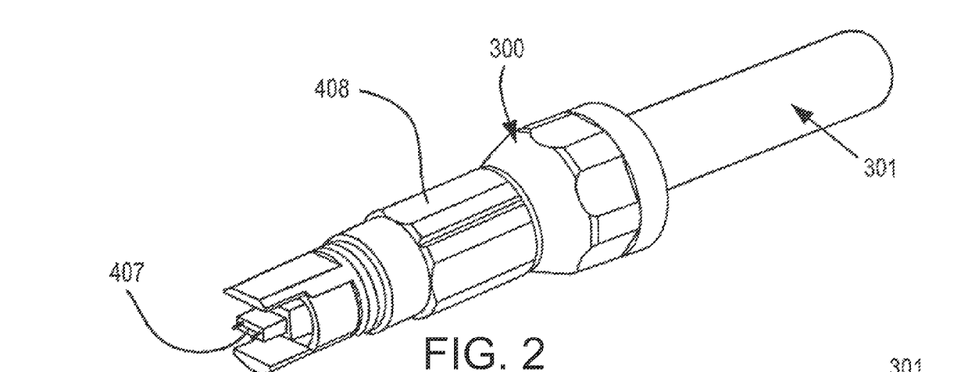
FIG. 2 illustrates an exemplary loop back plug for use in testing factory integrated terminations consistent with principles of the disclosure.
Figure 3:
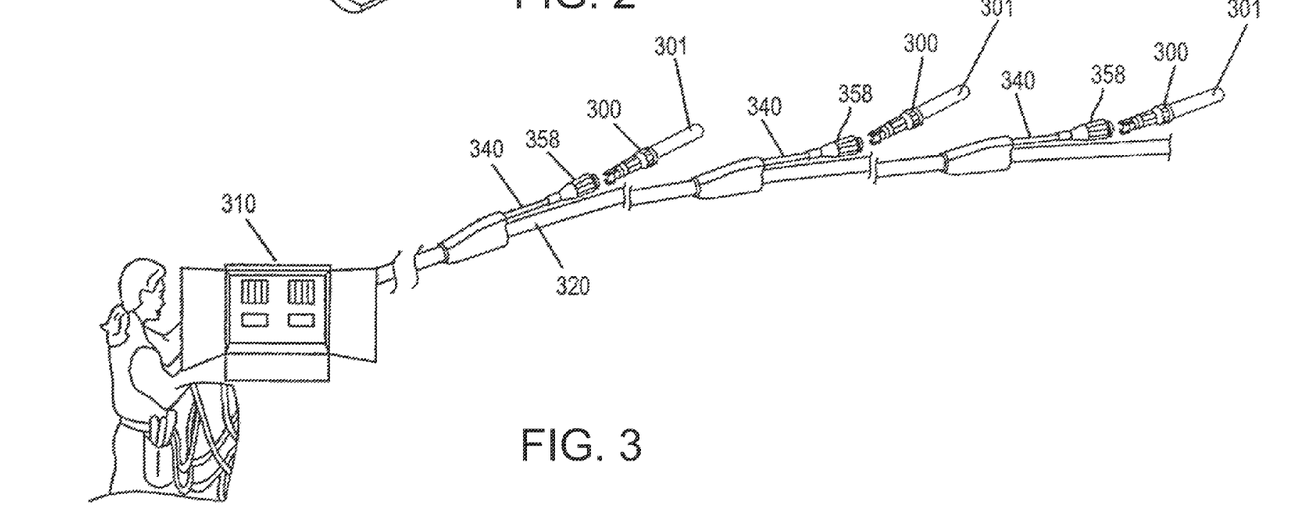
FIG. 3 illustrates a distribution cable having connectorized tethers to which the loop back plug of FIG. 2 can be interconnected.

FIG. 2 illustrates an exemplary loop back plug 300 for use in testing factory integrated terminations such as those shown in the distribution cable 319 of FIG. 3. The distribution cable 319 includes a trunk cable 320 and a plurality of tethers 340 that branch from the trunk cable 320 at factory installed breakout locations 321. Each of the tethers 340 is preconnectorized with a connector 358. Each of the connectors is adapted to interconnect with a corresponding one of the loop back plugs 300 to facilitate testing of the distribution cable 319. The loop back plug 300 may be configured to couple a first fiber in the tether 340 to a second fiber in the tether 340. The loop back plug 300 can include a multi-termination (MT) ferrule 407 defining multiple fiber openings or bores receiving fibers that define fiber loops. The loop back plug 300 also includes a housing 301 enclosing the fiber loops and a fastener such as a coupling nut 408 for securing the loop back plug to one of the connectors 358. The housing 301 can assist to anchor radiuses of the fiber loops such as by receiving injected epoxy into the housing to permanently secure bend radiuses of the fiber loops. At a remote location 310, such as a central office, a test signal can be injected into a first fiber and detected on a second fiber at the central office 310. Use of the loop back plug 300 may eliminate shuttling back and forth between a tether 340 and the central office 310 when testing is performed. Eliminating shuttling can produce significant time and cost savings when testing deployed distribution cables 320.

Implementations of factory integrated terminations may include tethers 340 that are terminated with connectors. For example, an MT female connector 358 may be installed on a distal end of one or more tether fibers optically coupled (e.g., by a splice or by an integral coupling) to fibers routed through the trunk of the distribution cable. Examples of connectors and/or receptacles that may be adapted for use on the distal end of a tether are further described in U.S. Pat. Nos. 6,648,520, 6,579,014, and 7,264,402.

An implementation, such as the one shown in FIG. 3 may include a tether 340 having 12 fibers that may be terminated with a connector 358. Implementations terminated with a connector may be tested with a loop back plug 300. The loop back plug 300 may also act as a dust cover to protect fibers within the connector from dirt and moisture. Inconsistent insertion losses that occur upon insertion of the loop back plug 300 into the connector 358 can cause inconsistent test results. Thus, tuning the loop back plug provides a means to provide a consistent insertion loss value associated with each of the loops of the loop back plug 300. Additional details regarding tuning the loop back plug 300 will be described below with respect to FIGS. 5-7.

Figure 4:
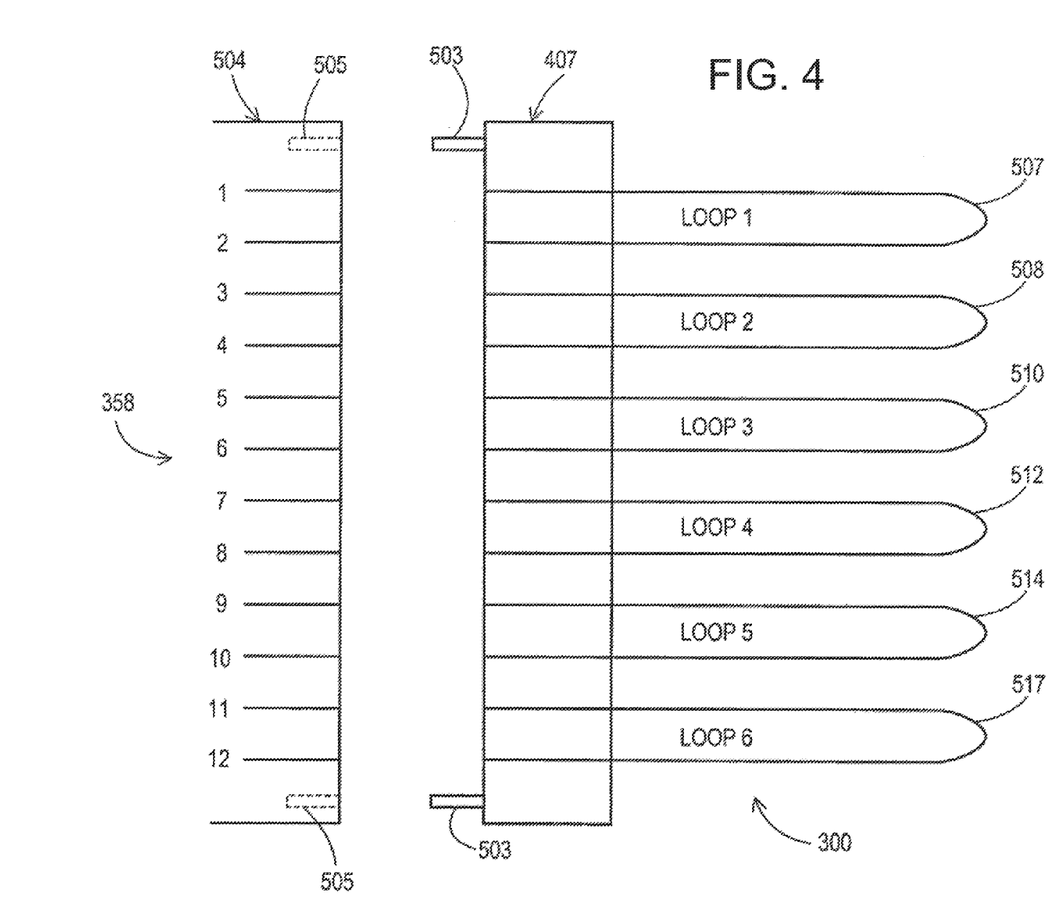
FIG. 4 illustrates a schematic view of the loop back plug of FIG. 2 prior to being tuned along with a schematic representation of a twelve ribbon fiber multi-termination (MT) connector ferrule consistent with the principles of the disclosure.

FIG. 4 illustrates a schematic view of the loop back plug of FIG. 2 prior to being tuned along with a schematic representation of a twelve fiber multi-termination (MT) connector ferrule 504. The loop back plug 300 includes the MT ferrule 407 defining twelve fiber openings or bores receiving six fibers that define fiber loops 507, 508, 510, 512, 514, and 517. The fibers have ends mounted in the fiber openings of the MT loop back plug ferrule 407. As shown, loop 507 has ends located at positions 1 and 2 of the ferrule 407, loop 508 has ends located at positions 3 and 4 of the ferrule 407, loop 508 has ends located at positions 3 and 4 of the ferrule 407, loop 510 has ends located at positions 5 and 6 of the ferrule 407, loop 512 has ends located at positions 7 and 8 of the ferrule 407, loop 514 has ends located at positions 9 and 10 of the ferrule 407, and loop 517 has ends located at positions 11 and 12 of the ferrule 407. In other embodiments, other loop arrangements can be used. For example, the first loop can have ends that terminate at positions 1 and 12 of the ferrule, the second loop can have ends that terminate at positions 2 and 11 of the ferrule, the third loop can have ends that terminate at positions 3 and 10 of the ferrule, the fourth loop can have ends that terminate at positions 4 and 9 of the ferrule, the fifth loop can have ends that terminate at positions 8 and 5 of the ferrule and the sixth loop can have ends that terminate at positions 7 and 6 of the ferrule. In other embodiments, the loop back plug can have a configuration of the type disclosed at U.S. application Ser. No. 11/771,306, now U.S. Pat. No. 7,630,610, that is hereby incorporated by reference in its entirety.

The loop back plug 300 also includes alignment pins 503 operative to align the ends of the fiber loops 507, 508, 510, 512, 514, and 517 with optical fibers 1 through 12 when complimentarily received by pin receivers 505 of the MT connector ferrule 504. The end face of both the loop back plug ferrule 407 and the connector ferrule 504 are polished to minimize losses when the connector ferrule 504 and the loop back plug 300 are engaged. The fiber loops 507, 508, 510, 512, 514, and 517 may be the same length yet each fiber loop has an adjustable insertion loss associated with it based on a bend radius of the respective loop. Additional details regarding adjustable insertion loss will be described below with respect to FIGS. 5-7.

Figure 5:
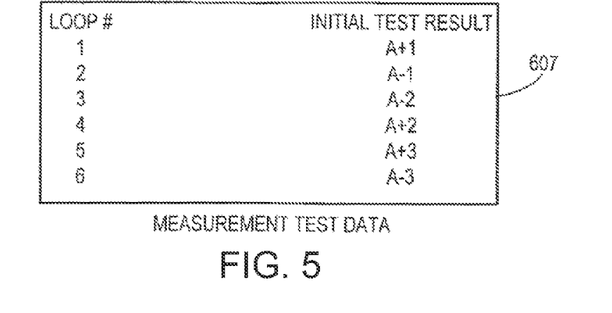
FIG. 5 illustrates a table indicating initial insertion loss measurement test results prior to making tuning adjustments to the loop back plug consistent with the principles of the disclosure.

FIG. 5 illustrates a table 607 indicating initial insertion loss measurement test results prior to making tuning adjustments to the loop back plug 300 consistent with the principles of the invention. Referring to table 607, a target insertion loss of "A" in decibels, for example 5 dB, may be established as a predetermined target insertion loss associated with the loop back plug 300. As the table 607 illustrates, loop 1 507 connected to fibers 1 and 2 of FIG. 5, is initially measured at 1 dB above the target insertion loss of A, loop 2 508 is measured at 1 dB below the target insertion loss of A.

Figure 6:
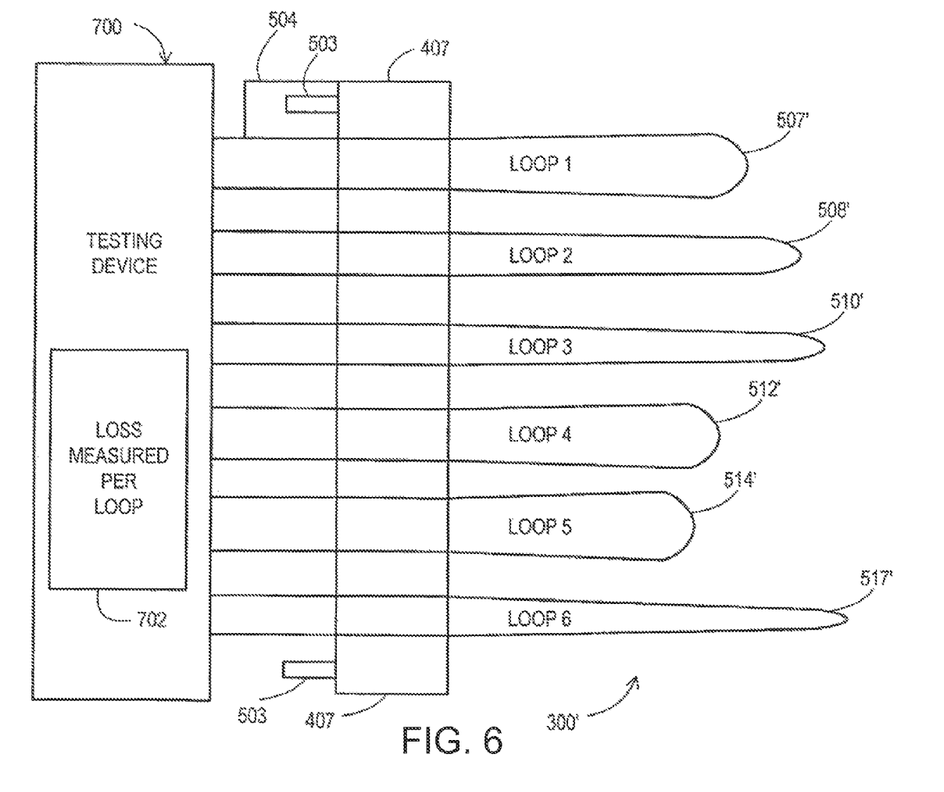
FIG. 6 illustrates a block diagram representation of a testing device used in measuring insertion losses associated with each loop in the loop back plug of FIG. 4 in order to generate the measurement test results of FIG. 5 and a schematic view of the loop back plug of FIG. 4 after receiving tuning adjustments consistent with the principles of the disclosure.

FIG. 6 illustrates a block diagram representation of a testing device 700 used in measuring insertion losses associated with each loop in the loop back plug 300 of FIG. 4 in order to generate the measurement test results of FIG. 5 and a schematic view of the loop back plug 300 of FIG. 4 after receiving tuning adjustments consistent with the principles of the disclosure. The testing device 700 includes a measurement display 702 for displaying to a user individual fiber loop insertion loss values. The testing device 700 injects light into the fiber loops of the loop back plug to test insertion loss. In order to tune the loop back plug 300, the bend radius of the loop fibers are adjusted. For instance, the bend radius of loop fiber (1) 507' is increased in order to reduce the measured insertion loss closer to A dB, for instance within a predetermined tolerance such as ±0.25 dB.

Similarly, the bend radius of loop fiber (2) 508' is decreased in order to increase the measured insertion loss associated with the loop fiber 2 508' by 1 dB. Further, the bend radiuses of loop fibers (3-6) 510', 512', 514', and 517' are changed in order to tune the measured insertion loss to A dB. Thus, at least some of the fiber loops have different bend radiuses selected or formed to tune the loop back plug 300' so that each of the fiber loops has the same or approximately the same insertion loss value. Once a loop fiber is tuned to the established insertion loss value of A dB, the tuned loop fiber is temporarily stabilized/secured (e.g. taped) to prevent changes in the bend radiuses selected to tune the loop back plug 300.

Thus, the tuned loop back plug 300 compensates for insertion loss variations that may occur from fiber to fiber at the plug 300. One example reason for insertion loss variations relates to insertion loss caused by fiber core offsets that may occur at the interface between the ferrule 407 and the ferrule of the connector 358. This type of insertion loss is more dramatic with lower precision fibers, ferrules and manufacturing processes. It should be appreciated that because precision of the MT loop back ferrule 407 is not as critical for the plug 300, the loop back plug 300 can be manufactured for a relatively low cost. In certain embodiments, multi mode fibers may be used to form the loops of the loop back plug.

Figure 7:
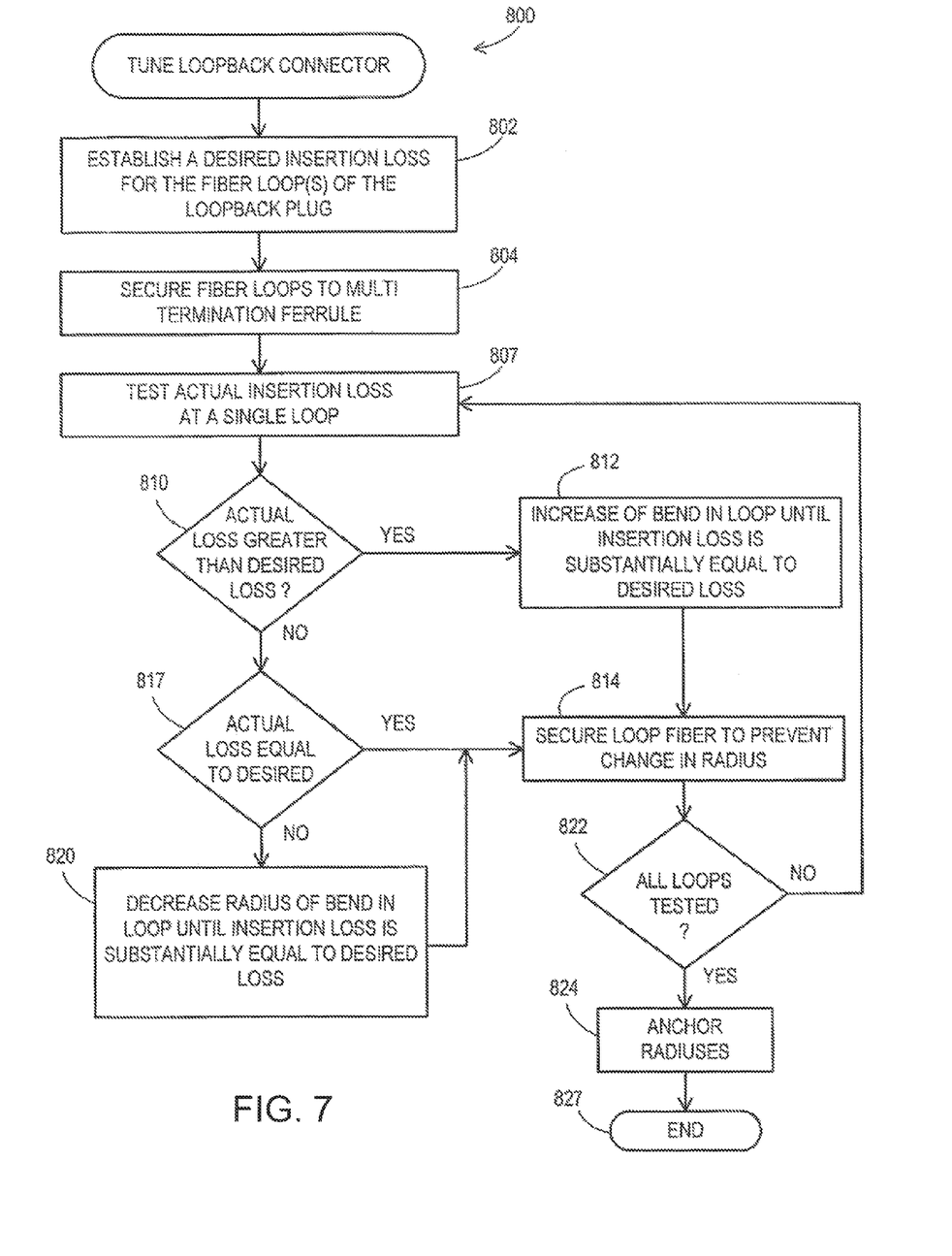
FIG. 7 illustrates an exemplary method for fabricating and tuning a loop back plug for use in testing a distribution cable consistent with the principles of the disclosure.

FIG. 7 illustrates an exemplary method 800 for fabricating and tuning a loop back plug for use in testing a distribution cable consistent with the principles of the invention. The method 800 commences with receipt of a desired overall insertion loss for the fiber loops of a loop back plug (act 802). For example, a customer may request that loop back plugs not exceed a 5 dB constant insertion loss for one wavelength when engaged with MT connectors. A desired number of fiber loops may be secured or mounted to the MT ferrule of the loop back plug and the MT ferrule may be coupled to the testing device (act 804). An insertion loss measurement of each fiber loop in the loop back connector may be tested one at a time to measure an actual insertion loss associated with the fiber loop (act 807). A determination of whether the actual insertion loss is greater than the established desired insertion loss is made by comparing the actual insertion loss value with the established desired insertion loss value (act 810). When the actual insertion loss value is greater than the established desired insertion loss value, the radius of a bend in the fiber loop measured is increased until the actual insertion loss value associated with that fiber loops is substantially equal or tuned to the desired insertion loss value, A dB (act 812).

When the actual insertion loss value is not greater than the desired insertion loss, a determination is made as to whether the actual insertion loss is equal to the desired insertion loss (act 817). When the actual insertion loss value is substantially equal to the established desired insertion loss value, the measured fiber loop is secured, for example by adhesive, to prevent a change in the radius of the bend in that loop fiber such that the actual insertion loss value associated with that fiber loop remains substantially equal to the desired insertion loss value (act 814). When the actual insertion loss value is less than the established desired insertion loss value, the radius of the bend in the measured fiber loop is decreased until the actual insertion loss value associated with that fiber loop is substantially equal to the desired insertion loss value (act 820). It should be appreciated that when the actual insertion loss value is substantially greater than the desired insertion loss value such that the desired insertion loss value cannot be reached by changing the radius of the bend in the one of the fiber loops, the loop back plug may be discarded.

Once a fiber loop has been secured (act 814), a determination is made as to whether all the fiber loops have been measured or tested (act 822). It should be appreciated that it may be advantageous to begin tuning the fiber loop having the lowest measured insertion loss value. When all fiber loops have not been tested, the method 800 returns to act 807 described above. When all the fiber loops have been tested, the radiuses are anchored into the loop back plug to permanently secure each radius of the fiber loops (act 824). Thus, the loop back plug compensates for variations in core offset associated with the loop back plug and the connector to produce a uniform or constant insertion loss associated with the loop back plug. The method 800 then ends (act 827).

Modifications and variations are possible in light of the above teachings. For example, while a series of acts have been described with respect to FIG. 8, the order of the acts may be varied in other implementations. Moreover, non-dependent acts may be implemented in parallel.

No element, act, or instruction used in the detailed description should be construed as critical or essential to the invention unless explicitly described as such. Also, as used herein, the article "a" is intended to include one or more items. Where only one item is intended, the term "one" or similar language That which is claimed is:

1. A method for tuning a loop back device to an established loss consistent among all fiber loops in the loop back device, the method comprising:
   a) establishing a desired loss value for the fiber loops of the loop back device;
   b) securing ends of fibers of the fiber loops to a multiple termination (MT) ferrule;
   c) measuring an actual loss value associated with one of the fiber loops;
   d) comparing the actual loss value with the established desired loss value;
   e) when the actual loss value is greater than the established desired loss value, increasing a radius of a bend in the one of the fiber loops until the actual loss value associated with the one of the fiber loops is substantially equal to the established desired loss value;
   f) when the actual loss value is less than the established desired loss value, decreasing the radius of the bend in the one of the fiber loops until the actual loss value associated with the one of the fiber loops is substantially equal to the established desired loss value; and
   g) when the actual loss value is substantially equal to the established desired loss value, securing the one of the fiber loops to prevent a change in the radius of the bend in the one of the fiber loops such that the actual loss value associated with the one of the fiber loops remains substantially equal to the established desired loss value; and
   h) repeating c) through g) for each of the fiber loops in the loop back device.

2. The method of claim 1, further comprising anchoring the radius of each of the bends in the loop back device to permanently secure the radius of each of the fiber loops.

3. The method of claim 1, wherein the securing of the one of the fiber loops comprises applying an anchoring means to the one of the fiber loops to prevent the change in the radius of the bend.

4. The method of claim 1, wherein the securing of the ends of the fibers of the fiber loops to the MT ferrule comprises mounting the ends of the fibers defining the fiber loops to openings defined through the MT ferrule.

5. The method of claim 1, wherein the establishing of the desired loss value for the fiber loops comprises setting a value equal to a requested maximum loss value measurable in decibels for a specified wavelength.

6. The method of claim 1, further comprising when the actual loss value is substantially greater than the established desired loss value such that the established desired loss value cannot be reached by changing the radius of the bend in any of the fiber loops, disposing of the loop back device.

7. The method of claim 1, wherein the increasing of the radius of the bend in the one of the fiber loops comprises widening the bend until the actual loss value associated with the one of the fiber loops is within a predetermined tolerance of the established desired loss value.

8. The method of claim 1, wherein executing c) through g) for each of the fiber loops comprises compensating for variations in core offset associated with the loop back device to provide a uniform overall insertion loss associated with the loop back device.

9. A method for fabricating a loop back device having a plurality of fibers defining fiber loops, each of the fiber loops having a substantially consistent insertion loss among all of the fiber loops in the loop back device, the method comprising:
   determining an actual loss value associated with each of the fiber loops;
   comparing the actual loss value of each of the fiber loops with a desired loss value;
   when the actual loss value of any of the fiber loops is greater than the desired loss value, increasing a radius of a bend in the fiber loops having the greater actual loss value until the actual loss value associated with the corresponding fiber loops are within a tolerance of the desired loss value;
   when the actual loss value of the any of the fiber loops is less than the desired loss value, decreasing the radius of the bend in the fiber loops having the lesser actual loss value until the actual loss value associated with the corresponding fiber loops are within the tolerance of the desired loss value; and
   when the actual loss value of the any of the fiber loops is within the tolerance of the desired loss value, fixing a shape of the fiber loops to prevent a change in the radius of the bend.

10. The method of claim 9, further comprising establishing the desired loss value for the fiber loops of the loop back device, wherein the establishing of the desired loss value for the fiber loops comprises setting a value equal to a maximum insertion loss value measurable in decibels.

11. The method of claim 9, further comprising providing an anchoring means in the loop back device to permanently secure each of the radii of the fiber loops.

12. The method of claim 9, wherein the fixing of the shape of the fiber loops comprises applying adhesive to the fiber loops to prevent a subsequent change in the radius of the bend in the any of the fiber loops.

13. The method of claim 9, further comprising mounting the fiber loops to an MT ferrule by securing ends of the plurality of fibers defining the fiber loops into openings defined through the MT ferrule.

14. A method for fabricating a loop back device having a plurality of fibers defining fiber loops, each of the fiber loops having a substantially consistent insertion loss among all of the fiber loops in the loop back device, the method comprising:
   mounting the plurality of fibers to a multi-termination (MT) ferrule;
   determining an actual insertion loss value associated with each of the fiber loops;
   comparing the actual insertion loss value of each of the fiber loops with a desired insertion loss value; and
   tuning to adjust an overall insertion loss of the loop back device by changing a radius of a bend in any of the fiber loops having a greater actual insertion loss value or a lesser actual insertion loss value compared with the desired insertion loss value to tune the overall insertion loss to the desired insertion loss value.

15. The method of claim 14, further comprising when the actual insertion loss value of the any of the fiber loops is tuned to the desired insertion loss value, securing the tuned fiber loops having the tuned actual insertion loss value to prevent a change in the radius of the bend in the tuned fiber loops such that the tuned actual insertion loss value associated with the tuned fiber loops remains tuned to the desired insertion loss value.

16. The method of claim 14, wherein the changing of the radius of the bend comprises decreasing the radius of the bend in the any of the fiber loops having the actual insertion loss value less than the desired insertion loss value to tune the actual insertion loss value of the any of the fiber loops to the desired insertion loss value.

17. The method of claim 14, wherein the changing of the radius of the bend comprises increasing the radius of the bend in the any of the fiber loops having the actual insertion loss value greater than the desired insertion loss value to tune the actual insertion loss value of the any of the fiber loops to the desired insertion loss value.

18. The method of claim 14, wherein the changing of the radius of the bend comprises first changing the radius of the any of the fiber loops measured to have a lowest insertion loss value.

* * * * *